United States Patent
Krauss

(10) Patent No.: US 9,409,479 B2
(45) Date of Patent: Aug. 9, 2016

(54) SETTING DEVICE FOR MOTOR VEHICLE ASSISTANCE FUNCTION UNITS AND STEERING COLUMN LEVER OPERATOR CONTROL ASSEMBLY

(71) Applicant: Dr. Ing. h.c. F. Porsche Aktiengesellschaft, Stuttgart (DE)

(72) Inventor: Lutz Krauss, Karlsruhe (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 31 days.

(21) Appl. No.: 14/248,434

(22) Filed: Apr. 9, 2014

(65) Prior Publication Data

US 2014/0316670 A1  Oct. 23, 2014

(30) Foreign Application Priority Data

Apr. 19, 2013 (DE) .......................... 10 2013 103 978

(51) Int. Cl.

| | |
|---|---|
| G06F 7/70 | (2006.01) |
| G06F 19/00 | (2011.01) |
| G06G 7/00 | (2006.01) |
| G06G 7/76 | (2006.01) |
| B60T 8/32 | (2006.01) |
| G05D 1/00 | (2006.01) |
| G06F 7/00 | (2006.01) |
| G06F 17/00 | (2006.01) |
| B60K 31/00 | (2006.01) |
| B60W 30/14 | (2006.01) |
| B60W 30/16 | (2012.01) |

(52) U.S. Cl.
CPC .............. *B60K 31/00* (2013.01); *B60K 2310/20* (2013.01); *B60W 30/143* (2013.01); *B60W 30/146* (2013.01); *B60W 30/16* (2013.01); *Y02T 10/84* (2013.01)

(58) Field of Classification Search
CPC .......................... B60K 2310/00; B60K 2310/20
See application file for complete search history.

(56) References Cited

U.S. PATENT DOCUMENTS

| | | | |
|---|---|---|---|
| 5,665,026 A | 9/1997 | Linden | |
| 5,713,428 A | 2/1998 | Linden et al. | |
| 2003/0195704 A1* | 10/2003 | Sekiguchi | B60W 30/16 701/301 |
| 2007/0255479 A1* | 11/2007 | Gruenter | B60K 31/042 701/93 |
| 2008/0270001 A1* | 10/2008 | Seto | B60K 31/00 701/93 |

FOREIGN PATENT DOCUMENTS

| | | |
|---|---|---|
| DE | 19509492 C2 | 9/1996 |
| DE | 19509494 C2 | 9/1996 |
| DE | 102006017330 U1 | 10/2006 |
| DE | 102006028463 A1 | 12/2007 |
| JP | H 115456 A | 1/1999 |
| JP | 2007015558 A | 1/2007 |

* cited by examiner

Primary Examiner — Yonel Beaulieu
Assistant Examiner — Lail Kleinman
(74) Attorney, Agent, or Firm — Leydig, Voit & Mayer, Ltd.

(57) ABSTRACT

A device is configured for setting at least three assistance function units that influence the speed of a motor vehicle. The assistance function units are selected from a group consisting of a speed maintaining assistance function unit, a predictive distance control assistance function unit, a speed limiting assistance function unit, and an uphill or downhill travel assistance function unit. The device includes an individual switching operator control unit and a control unit configured to monitor the actuation of the individual switching operator control unit, and select an assistance function unit when the individual switching operator control unit is activated.

10 Claims, 2 Drawing Sheets

SETTING DEVICE FOR MOTOR VEHICLE ASSISTANCE FUNCTION UNITS AND STEERING COLUMN LEVER OPERATOR CONTROL ASSEMBLY

CROSS REFERENCE TO RELATED APPLICATIONS

This application claims priority from German Patent Application No. DE 10 2013 103 978.2, filed Apr. 19, 2013, which is hereby incorporated by reference herein in its entirety.

FIELD

The present invention relates to a device for setting at least three assistance function units which influence the speed of a motor vehicle.

BACKGROUND

A speed maintaining assistance function unit, which is also referred to as a "cruise controller", has been known for a long time in the field of assistance function units which influence the speed of a motor vehicle. This assistance function unit generally includes an operator control assembly with a plurality of function operator control units. A function operator control unit can serve, for example, for activating the speed maintaining assistance function unit, a further function operator control unit can serve, for example, for setting the current vehicle speed as the speed which is to be maintained, and further function operator control units can serve, for example, for decelerating and accelerating. The operator control assembly can be integrated here into an impact plate of a steering wheel, but can also be integrated into a steering column lever. In the case of integration into a steering column lever it is known to configure the steering column lever in such a way that it can be activated in the forward, rearward, upward and/or downward direction in order to configure at least one function operator control unit. In addition it is known to integrate a function operator control unit in the form of an on/off switch into such a steering column lever.

For some years, distance control assistance function units have been known which are frequently integrated into the speed maintaining assistance function units. The function is the same as in the case of the speed maintaining assistance function unit, when the speed is additionally controlled as a function of a selectable distance from a vehicle in front. The selectable distance can frequently be set here by means of a further function operator control unit which can be set by means of a software menu of an infotainment operator control system or by means of a further switch which can be arranged on the steering column lever.

In the field of assistance function units which influence the speed of a motor vehicle it is also known to make available a speed limiter. The latter can store a maximum speed, the maximum speed is frequently set by means of an infotainment menu (another steering column lever can, if appropriate, serve for this purpose). In many cases, the speed limiting assistance function unit can output a warning tone in this context when the maximum speed which has been set is exceeded, or else can intervene in a controlling fashion to ensure that the speed is not exceeded.

Finally, it is known to provide what is referred to as an uphill or downhill travel assistance function unit which is provided, for example, as a hill descent control. In this context, a switch is generally activated on the dashboard, as a result of which there is an interplay between the actuation of the engine and the actuation of the brakes to the effect that in the case of downhill travel a specific speed is not exceeded and the wheels do not lock.

Finally, for some time a concept has been known according to which distance control is carried out predictably. In this context, a plurality of supplementary information items about the distance to be traveled, for example, gradient profiles, traffic lights, etc., are acquired for the distance control. As a rule, measured values of a navigation system are generally included here in the distance control. However, further information items cannot be used in this context such as, for example, an indication of the traffic density, which can be determined either by a navigation system or else by other information systems (mobile radio, Internet, etc.). In this context it is to be possible to select a control stage which is directed, for example, to an economic driving style or else to a sporty driving style.

Document DE 10 2006 017 330 U1 discloses a steering switch module for a motor vehicle which has at least two multi-pushbutton-key operator control switch arrangements, wherein the steering switch module is configured in such a way that it can be installed in a spoked steering wheel and removed therefrom after being prefabricated as an entire unit. In this context, both cruise control functions and multimedia functions can be operated by means of the steering wheel switch module.

Document DE 10 2006 028 463 A1 discloses a motor vehicle with a display which is arranged in the dashboard and which is divided into a display panel and menu selection fields, wherein at least one menu-specific information item which can be changed dynamically can be displayed in at least some of the menu selection fields. From the document it is also know to integrate selection elements into the steering wheel, by means of which elements the menus can be selected and functions can be controlled.

In addition, document DE 195 09 492 C2 discloses a method for limiting the speed of a motor vehicle to a maximum speed, wherein an acceleration-controlling system intervention or a speed-controlling system intervention can take place. It is also disclosed to provide an operator control device with a switch for switching between cruise control mode and speed limiting mode as well as with a common operator control lever for setting both the cruise control speed setpoint value and the maximum speed for the limiting function, wherein a plurality of maximum speed values can be stored in a memory and called therefrom by means of the operator control lever.

Document DE 195 09 494 C2 discloses a device for regulating the speed of a motor vehicle, having a cruise controller function assembly and having a limiting function assembly. In addition, an operator control device is provided for optionally activating the cruise controller function assembly or the limiting function assembly with simultaneous deactivation of the respective other assembly. The operator control device here has a switching element for switching between the cruise controller mode and the limiting mode and an operator control lever which is configured in the manner of a customary cruise control operator control lever.

SUMMARY

In an embodiment, the present invention provides a device for setting at least three assistance function units that influence the speed of a motor vehicle. The assistance function units are selected from a group consisting of a speed maintaining assistance function unit, a predictive distance control assistance function unit, a speed limiting assistance function unit, and an uphill or downhill travel assistance function unit. The device includes an individual switching operator control unit and a control unit configured to monitor the actuation of the individual switching operator control unit, and select an assistance function unit when the individual switching operator control unit is activated.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
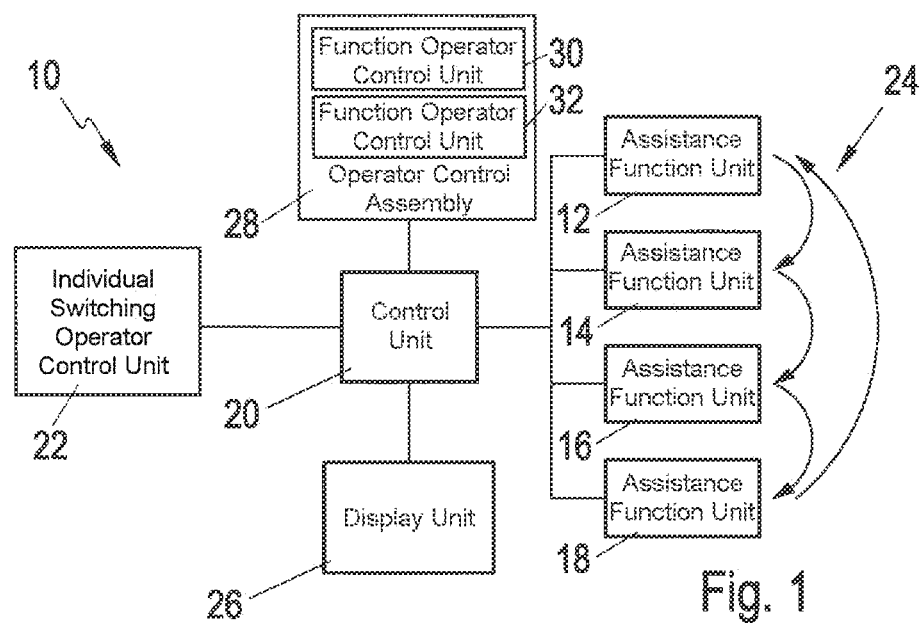
FIG. 1 shows a schematic illustration of an embodiment of a setting device according to the invention.

In an embodiment, the present invention provides a device for setting at least three assistance function units which influence the speed of a motor vehicle, and a steering column lever operator control assembly, which are advantageous, in particular in terms of ergonomics.

In an embodiment, the present invention provides a device for setting at least three assistance function units which influence the speed of a motor vehicle and which are selected from a speed maintaining assistance function unit, a predictive distance control assistance function unit, a speed limiting assistance function unit and an uphill or downhill travel assistance function unit, wherein the setting device has an individual switching operator control unit, and a control unit which is configured to monitor the actuation of the individual switching operator control unit, and to select an assistance function unit, in particular in each case a different assistance function unit, when or whenever the individual switching operator control unit is activated.

In addition, in an embodiment, the present invention provides a steering column lever operator control assembly for influencing the speed of a motor vehicle, having a steering column lever which can be activated in a forward, rearward, upward and/or downward direction in order to configure at least one function operator control unit with respect to the forward direction of travel of the motor vehicle, and having an individual switching operator control unit, arranged on the steering column lever, for setting at least three assistance function units which influence the speed of the motor vehicle.

Finally, in an embodiment, the present invention provides a motor vehicle having a setting device according to the invention and/or having a steering column lever operator control assembly according to the invention.

The present invention is consequently aimed, on the one hand, at the fact that a plurality of assistance function units which influence the speed of a motor vehicle can be selected by means of an individual switching operator control unit. As a result, it is possible to ensure, by means of just an individual switching operator control unit, that a plurality of such assistance function units can be selected. This prevents the driver from having to remember different locations for selection for the various assistance function units which influence the speed of the motor vehicle, such as, for example, a switch on the dashboard, an operator control assembly in the steering wheel and a steering column lever, such as he usually uses for cruise control functions. The speed maintaining assistance function unit can include an automatic distance control assistance function unit in this context. The term operator control unit is to be understood broadly here. This can be understood to be a touch screen, a multi-selection switch or else a pushbutton key. A gesture-based controller is generally also conceivable for the switching operator control unit.

In the case of the steering column lever operator control assembly according to the invention, a switching operator control unit is arranged here on that steering column lever which also includes at least one further function operator control unit for influencing the speed of the motor vehicle, for example, a cruise control steering column lever.

There is preferably provision that all the assistance function units which influence the speed of a motor vehicle and which are integrated or installed in the respective vehicle can be selected by means of the individual switching operator control unit. The term assistance function unit is preferably not intended to extend to accelerator pedal-coupled or brake pedal-coupled function units in this context.

Overall, in this way significantly more ergonomic operator control of the motor vehicle can be achieved.

In the setting device according to the invention, it is preferred if the switching operator control unit is embodied as a pushbutton key and if the control unit is configured to select the assistance function units sequentially when the pushbutton key is activated.

In this embodiment, the selection of the assistance function units can be implemented according to the "toggle" principle. A direct selection would require a relatively complex operator control unit. By the restriction to selecting the assistance function units sequentially, the switching operator control unit can be made particularly simple, specifically as a pushbutton key (which can be embodied mechanically or as a touch screen button).

In this context it is also preferred if the control unit is configured to select the assistance function units in a loop. If four different assistance function units can be selected, for example, by means of the switching operator control unit, they are selected successively in a sequence from 1 to 4 by actuating the switching operator control unit, and when they are actuated once more the first assistance function unit is selected again in the manner of a loop.

Overall, in the setting device according to the invention it is also advantageous if the control unit is configured to actuate, when an assistance function unit is selected, a display unit to display specific information for the selected assistance function unit.

The display unit can be integrated here, for example, into a dashboard and can have, for example, a display.

In addition it is preferred if the control unit is configured to monitor the activation of an operator control assembly which has at least two function operator control units, wherein the control unit is also configured to assign at least partially an operator control function which is specific to the selected assistance function unit to the function operator control units as a function of the selected assistance function unit.

This also permits the ergonomy to be improved since the number of function operator control units can be reduced overall.

In the steering column lever operator control assembly according to the invention it is preferred if the switching operator control unit is arranged in a lower region of the steering column lever with respect to a vehicle vertical axis.

This can also improve the ergonomy since the lower region of the steering column lever is generally not activated inadvertently but instead selected intentionally with the result that inadvertent switching of assistance function units is avoided.

It is preferred here if the steering column lever has a polygonal cross section and if the switching operator control unit is arranged on an underside of the steering column lever.

In addition it is advantageous if the switching operator control unit is embodied as a pushbutton key.

In this context assistance function units can be switched using, for example, a pushbutton key arranged on an underside of the steering column lever.

Overall, it is also preferred if the steering column lever operator control assembly is combined with a setting device of the type according to the invention.

Of course, the features mentioned above and the features still to be explained below can be used not only in the respectively specified combination but also in other combinations or alone without departing from the scope of the present invention.

FIG. 1 shows a schematic view of a first embodiment of a device for setting at least three assistance function units which influence the speed of a motor vehicle, wherein the setting device is denoted generally by 10 in FIG. 1.

The setting device 10 serves here to set a speed maintaining assistance function unit 12 into which an automatic distance control function can be integrated, a predictive distance control assistance function unit 14, a speed limiting assistance function unit 16 as well as an uphill or downhill travel assistance function unit 18, which can be embodied, in particular, as a hill descent assistance function unit.

The setting device 10 also includes a control unit 20, which is configured to select in each case one of the assistance function units 12-18. In addition, the setting device 10 has an individual switching operator control unit 22. The control unit 20 is configured here to monitor the activation of the individual switching operator control unit 22 and to select an assistance function unit in the event of activation of the switching operator control unit 22.

The setting device 10 is connected to a display unit 26. The control unit is configured, when an assistance function unit is selected, to actuate the display unit 26 to display information which is specific to the selected assistance function unit.

In this context, it is self-evident that the assistance function units 12-18 can each also be connected directly to the display unit 26, wherein in each case only the control of the display unit is transferred to one of the assistance function units by means of the control unit 20.

In addition, the setting device 10 includes an operator control assembly 28 which has at least two function operator control units 30, 32. The control unit 20 is configured to assign at least partially an operator control function specific to the selected assistance function unit to the function operator control units as a function of the selected assistance function unit.

Figure 2:
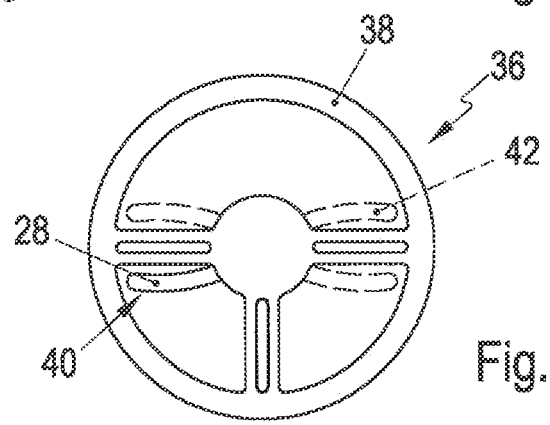
FIG. 2 shows a schematic view of a steering wheel with a steering column lever operator control assembly.

FIG. 2 shows in a schematic form a steering wheel arrangement 36 with a steering wheel 38, to which a first steering column lever operator control assembly 40 is assigned. Further steering column lever operator control assemblies can also be assigned to the steering wheel 38, as is indicated by dashed lines and schematically at 42.

The first steering column lever operator control assembly serves here to influence the speed of a motor vehicle and can include the operator control assembly 28. In addition, the first steering column lever operator control assembly can contain the switching operator control unit 22. Alternatively it is also possible to provide the switching operator control unit 22 on the steering wheel (for example in the region of an impact plate), or else on the dashboard.

Figure 3:
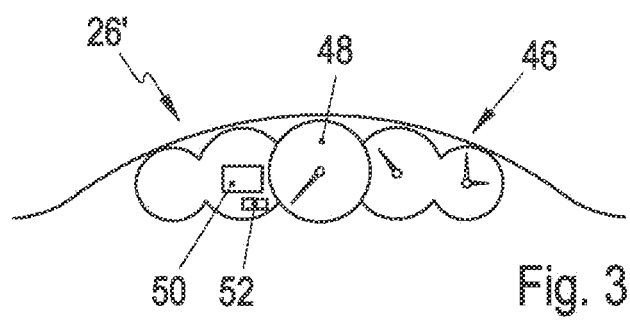
FIG. 3 shows a schematic view of a dashboard with a display unit.

FIG. 3 shows in a schematic form a dashboard 46 of a motor vehicle, having a centrally arranged rev counter 48 and a display unit 26', which has here a display 50 and a status display 52.

Information which is specific to a respectively selected assistance function unit can also be displayed on the display 50.

Figure 4:
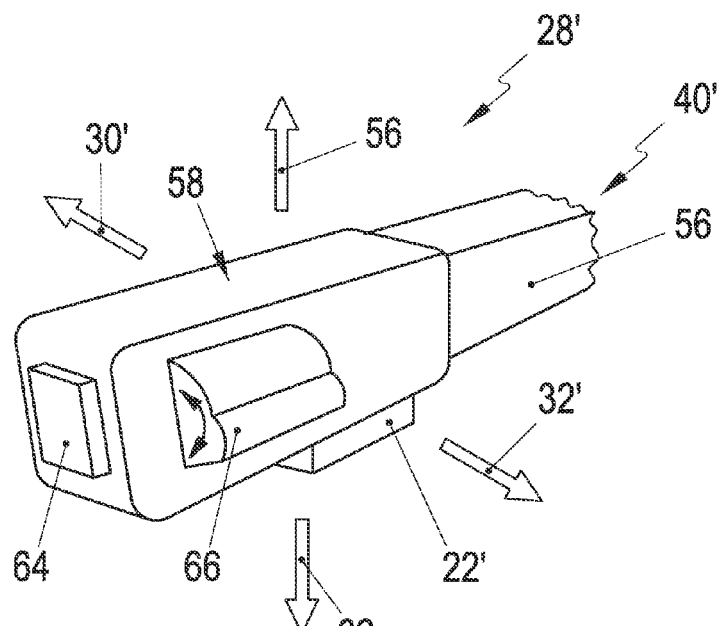
FIG. 4 shows a schematic perspective view of part of a steering column lever operator control assembly.

FIG. 4 shows an embodiment of a steering column lever operator control assembly 40' with a steering column lever 56, which has an end piece 58. Both an operator control assembly 28' and a switching operator control unit 22 are integrated into the end piece 58.

The steering column lever 56 can also be activated in a forward direction here, which is shown at 30', or in a rearward direction, which is shown at 32'. In addition, the steering column lever in this embodiment can also be activated in an upward direction, which is shown at 60, and as a result a third function operator control unit is configured. In a corresponding way, the steering column lever 56 can also be moved downward, which is shown at 62, and as a result a fourth function operator control unit is configured.

In addition, a fifth function operator control unit 64 is embodied in the form of an on/off pushbutton key on the free end side of the end piece 58.

On a side of the end piece 58 which is at the rear viewed in the direction of travel, a sixth function operator control unit 66 is arranged, which function operator control unit 66 can be used here, in particular to set a distance which is to be controlled by an automatic distance controller.

Finally, a pushbutton key 22' which has to be activated in an upward direction, and which forms the switching operator control unit here, is provided on the underside of the end piece 58.

The fifth function operator control unit 64 preferably serves for switching on and off all the assistance function units which influence the speed of the motor vehicle. The sixth function operator control unit 66 preferably serves exclusively to set a distance for an automatic distance controller which can be integrated into the speed maintaining assistance function unit 12, or for a predictive distance controller.

The first function operator control unit 30' serves to set a speed or to bring about acceleration, if appropriate also so-called "single-touch acceleration", for the speed maintaining assistance function unit 30' and for the uphill or downhill travel assistance function unit 18. The first function operator control units 30' serves, in the case of the predictive distance control assistance function unit 14, to activate said unit and to increase a limit deviation. In the case of the speed limiting assistance function unit 16, the first function operator control unit 30' serves to activate and to increase a limiting speed.

The second function operator control unit 32' serves to set a speed and to bring about deceleration, if appropriate single-touch deceleration, for the speed maintaining assistance function unit 12 and for the uphill or downhill travel assistance function unit 18. The second function operator control unit 32' serves to newly activate or to reduce a limit deviation in the case of the predictive distance control assistance function unit 14. In the case of the speed limiting assistance function unit 16, the second function operator control unit 32 serves to perform activation and reactivation and to reduce a limiting speed.

The third function operator control unit 60 serves for resuming in all the assistance function units with the exception of the predictive distance control assistance function unit 14. In the case of the predictive distance control assistance function unit 14, the third function operator control unit 60 serves for resuming and/or for deselecting a subsequent event.

The fourth function operator control unit 62 serves to perform interruption in all the assistance function units.

The switching operator control unit 22' serves for sequentially selecting the abovementioned four assistance function units, specifically in the manner of a loop.

Figure 5:
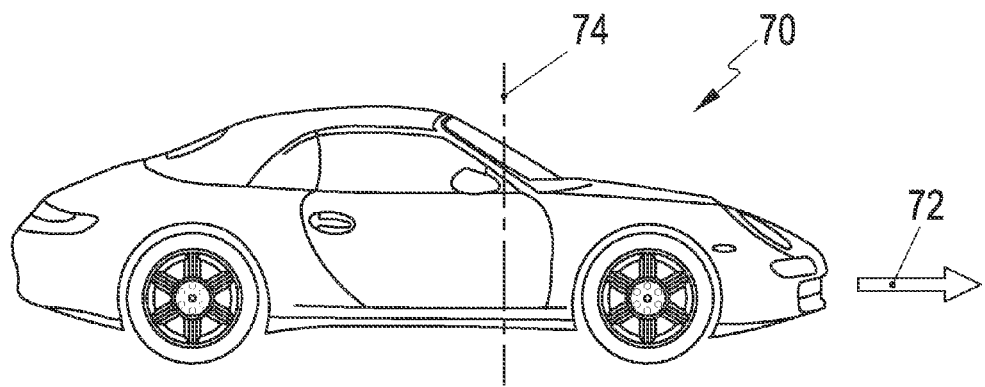
FIG. 5 shows a schematic side view of a motor vehicle.

FIG. 5 illustrates a motor vehicle 70 in schematic form, wherein a forward direction of travel 72 is illustrated, and in schematic form a vehicle vertical axis 74 for classifying the terms forward, rearward, upward and downward.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A setting device for setting assistance function units that influence the speed of a motor vehicle, the setting device comprising:
   an individual switching operator control unit for setting at least three assistance function units, wherein the assistance function units influence the speed of the motor vehicle, the at least three assistance function units being selected from a group consisting of a speed maintaining assistance function unit, a predictive distance control assistance function unit, a speed limiting assistance function unit, and an uphill or downhill travel assistance function unit; and
   a control unit configured to:
      monitor the actuation of the individual switching operator control unit,
      select one of the assistance function units when the individual switching operator control unit is activated,
      monitor the activation of an operator control assembly that has at least two function operator control units, and
      assign, at least partially, a respective operator control function that is specific to the selected assistance function unit to each of the at least two function operator control units as a function of the selected, assistance function unit.

2. The setting device as recited in claim 1, wherein the individual switching operator control unit includes a pushbutton key, and
   wherein the control unit is configured to select the assistance function units sequentially when the pushbutton key is activated.

3. The setting device as recited in claim 2, wherein the control unit is configured to select the assistance function units in a loop.

4. The setting device as recited in claim 1, wherein the control unit is configured to actuate, when an assistance function unit is selected, a display unit to display specific information for the selected assistance function unit.

5. A steering column lever operator control assembly for influencing the speed of a motor vehicle, the operator control assembly comprising:
   a steering column lever that is activatable in at least one of a forward, rearward, upward or downward direction in order to configure at least two function operator control units with respect to the forward direction of travel of the motor vehicle;
   an individual switching operator control unit, disposed on the steering column lever, for setting at least three assistance function units, wherein the assistance function units influence the speed of the motor vehicle, the at least three assistance function units being selected from a group consisting of a speed maintaining assistance function unit, a predictive distance control assistance function unit, a speed limiting assistance function unit and an uphill or downhill travel assistance function unit; and
   a control unit configured to:
      monitor the actuation of the individual switching operator control unit,
      select one of the assistance function units when the individual switching operator control unit is activated,
      monitor the activation of an operator control assembly that has the at least two function operator control units, and
      assign a respective operator control function that is specific to the selected assistance function unit to each of the at least two function operator control units as a function of the selected assistance function unit.

6. The steering column lever operator control assembly as recited in claim 5, wherein the switching operator control unit is arranged in a lower region of the steering column lever with respect to a vehicle vertical axis.

7. The steering column lever operator control assembly as recited in claim 6, wherein the steering column lever has a polygonal cross section, and the switching operator control unit is arranged on an underside of the steering column lever.

8. The steering column lever operator control assembly as recited in claim 5, wherein the switching operator control unit includes a pushbutton key.

9. The steering column lever operator control assembly as recited in claim 5 further comprising a device for setting at least three assistance function units that influence the speed of a motor vehicle, the assistance function units being selected from a group consisting of a speed maintaining assistance function unit, a predictive distance control assistance function unit, a speed limiting assistance function unit, and an uphill or downhill travel assistance function unit, the device including the individual switching operator control unit and a control unit configured to:

monitor the actuation of the individual switching operator control unit, and select an assistance function unit when the individual switching operator control unit is activated.

10. A motor vehicle including a setting device for setting assistance function units that influence the speed of a motor vehicle, the setting device comprising:

an individual switching operator control unit for setting at least three assistance function units, wherein the assistance function units influence the speed of the motor vehicle, the at least three assistance function units being selected from a group consisting of a speed maintaining assistance function unit, a predictive distance control assistance function unit, a speed limiting assistance function unit, and an uphill or downhill travel assistance function unit; and a control unit configured to:

monitor the actuation of the individual switching operator control unit, select one of the assistance function units when the individual switching operator control unit is activated, monitor the activation of an operator control assembly that has at least two function operator control units, and assign, at least partially, a respective operator control function that is specific to the selected assistance function unit to each of the at least two function operator control units as a function of the selected assistance function unit.

* * * * *